United States Patent
Wankhede et al.

(10) Patent No.: US 9,734,546 B2
(45) Date of Patent: Aug. 15, 2017

(54) SPLIT DRIVER TO CONTROL MULTIPLE GRAPHICS PROCESSORS IN A COMPUTER SYSTEM

(71) Applicant: NVIDIA Corporation, Santa Clara, CA (US)

(72) Inventors: Kirti Wankhede, Pune (IN); Andrew Currid, Alameda, CA (US); Surath Raj Mitra, Kolkata (IN); Chenghuan Jia, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 57 days.

(21) Appl. No.: 14/045,687

(22) Filed: Oct. 3, 2013

(65) Prior Publication Data

US 2015/0097844 A1 Apr. 9, 2015

(51) Int. Cl.
*G06F 15/80* (2006.01)
*G06T 1/20* (2006.01)

(52) U.S. Cl.
CPC ...................................... *G06T 1/20* (2013.01)

(58) Field of Classification Search
CPC ..... G06T 1/20; G06T 15/005; G06T 2210/52; G09G 5/333; G09G 5/363
USPC ........................................................ 345/505
See application file for complete search history.

(56) References Cited

U.S. PATENT DOCUMENTS

| | | |
|---|---|---|
| 5,251,295 A | 10/1993 | Ikenoue et al. |
| 5,485,559 A | 1/1996 | Sakaibara et al. |
| 5,781,747 A | 7/1998 | Smith et al. |
| 5,794,016 A | 8/1998 | Kelleher |
| 5,956,046 A | 9/1999 | Kehlet et al. |
| 6,044,215 A | 3/2000 | Charles et al. |
| 6,141,021 A | 10/2000 | Bickford et al. |
| 6,206,087 B1 | 3/2001 | Nakase et al. |
| 6,282,596 B1 | 8/2001 | Bealkowski et al. |
| 6,304,952 B1 | 10/2001 | Suzuoki |
| 6,359,624 B1 | 3/2002 | Kunimatsu |
| 6,397,343 B1 | 5/2002 | Williams et al. |
| 6,473,086 B1 | 10/2002 | Morein et al. |
| 6,476,816 B1 | 11/2002 | Deming et al. |
| 6,535,216 B1 | 3/2003 | Deming et al. |

(Continued)

OTHER PUBLICATIONS

"Heterogeneous cloud computing" (in "2011 IEEE International Conference on Cluster Computing", by Steve Crago, Kyle Dunn, Patrick Eads, Lorin Hochstein, Dong-In Kang, Mikyung Kang, Devendra Modium, Karandeep Singh, Jinwoo Suh, John Paul Walters. DOI 10.1109/Cluster.2011.49).*

*Primary Examiner* — Ke Xiao
*Assistant Examiner* — Gordon Liu

(57) ABSTRACT

A computer system includes an operating system having a kernel and configured to launch a plurality of computing processes. The system also includes a plurality of graphics processing units (GPUs), a front-end driver module, and a plurality of back-end driver modules. The GPUs are configured to execute instructions on behalf of the computing processes subject to a GPU service request. The front-end driver module is loaded into the kernel and configured to receive the GPU service request from one of the computing processes. Each back-end driver module is associated with one or more of the GPUs and configured to receive the GPU service request from the front-end driver module and pass the GPU service request to an associated GPU.

20 Claims, 5 Drawing Sheets

(56) References Cited

U.S. PATENT DOCUMENTS

| | | |
|---|---|---|
| 6,630,936 B1 | 10/2003 | Langendorf |
| 7,663,633 B1 | 2/2010 | Diamond et al. |
| 7,995,003 B1 * | 8/2011 | Diard .................... G06F 3/1438 345/1.1 |
| 9,075,559 B2 | 7/2015 | Wyatt et al. |
| 9,087,161 B1 | 7/2015 | Diamond |
| 9,135,675 B2 | 9/2015 | Wyatt et al. |
| 2012/0084774 A1 * | 4/2012 | Post et al. ......................... 718/1 |

* cited by examiner

SPLIT DRIVER TO CONTROL MULTIPLE GRAPHICS PROCESSORS IN A COMPUTER SYSTEM

BACKGROUND

A computer system with one or more graphics processing units (GPUs) may exhibit superior graphics capabilities, such as the ability to render high-resolution and/or three-dimensional video in real time. Each GPU installed in the system may include numerous processing cores, with each core capable of executing a different software thread. As such, each GPU is natively configured to enact parallel processing, where, for example, different software threads may be tasked with rendering different portions of an image, and/or different image frames in a video sequence. Parallel processing in a GPU may also provide graphics-rendering or other computing services to a plurality of concurrent processes. In computer systems equipped with a plurality of GPUs, an even greater degree of parallel processing may be available.

Nevertheless, not every computer system can support parallel processing with advanced, multi-core GPUs. Every GPU installed in a computer system contributes significantly to the size, cost, complexity, and power consumption of that system. Accordingly, portable computing devices such as smartphones, tablets, and even laptops may not be capable of high-performance graphics rendering or parallel computing in the manner of a desktop or workstation, for example. Furthermore, the act of mapping a large number of graphics-consumer processes to a large number of GPUs via a state-of-the-art driver layer is itself a complex task, the complexity increasing both with the number of computing processes and with the number of GPUs.

BRIEF DESCRIPTION OF THE DRAWINGS

This disclosure will be better understood from reading the following detailed description with reference to the attached drawing figures, wherein.

DETAILED DESCRIPTION

Figure 1:
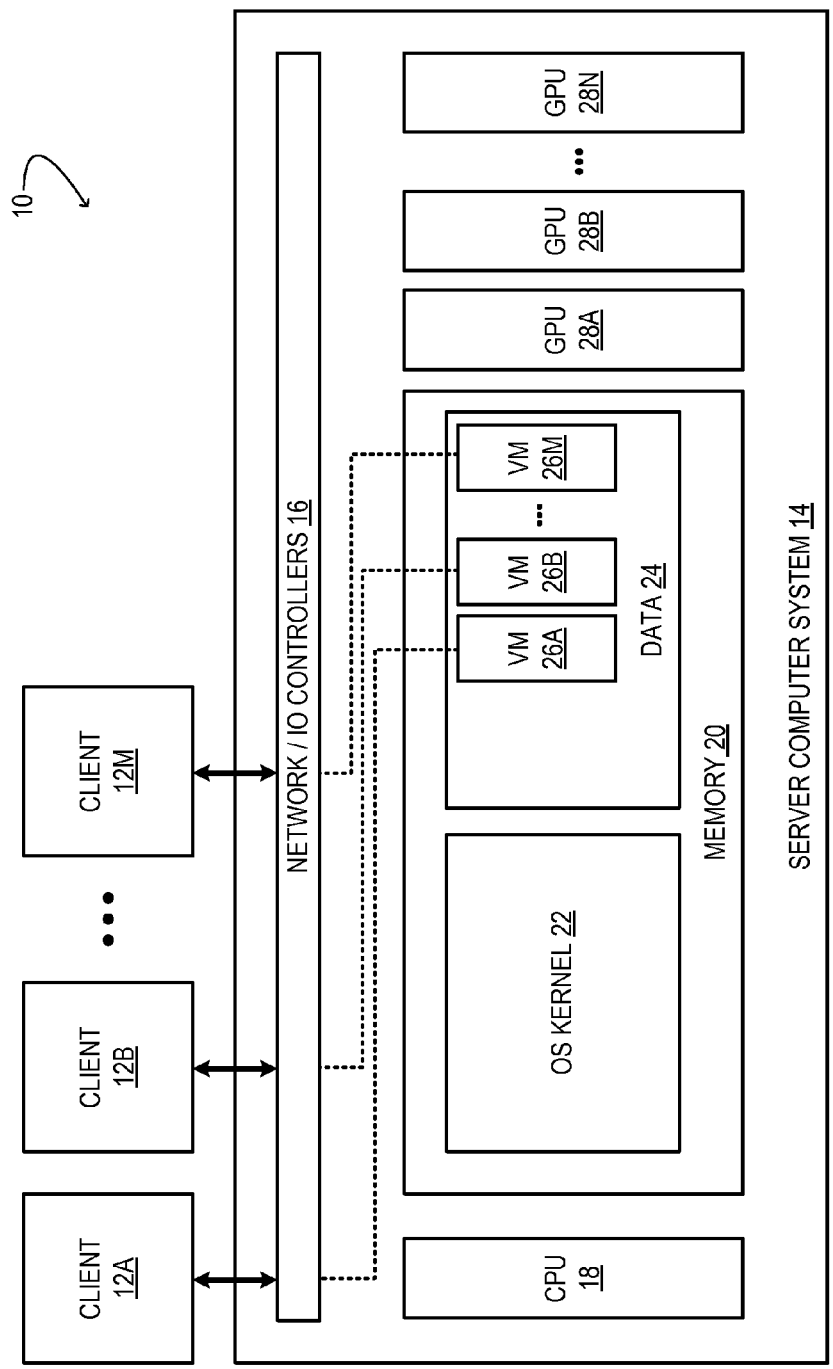
FIG. 1 shows aspects of an example environment to enable client computer devices to use resources of a server computer system, in accordance with an embodiment of the disclosure.

Aspects of this disclosure will now be described by example and with reference to the illustrated embodiments listed above. Components, process steps, and other elements that may be substantially the same in one or more embodiments are identified coordinately and described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 shows aspects of an example client-server environment 10, which allows a variety of client computer devices 12 to exploit the graphics-rendering and general-purpose computing power of a server computer system 14. The nature and number of the client computer devices supported in the environment may differ from one embodiment to the next. In some embodiments, the number may be one-hundred or more. Suitable client computer devices may include desktop computers, laptop computers, workstation terminals, tablet computers, smartphones, and portable and stationary game systems, for example.

Any client computer device 12 may include a display screen or near-eye display, along with componentry to output suitably rendered graphics onto the display. Such graphics may include textual graphics, still images, and/or video. In some embodiments, a client computer device may be configured to enact at least some graphics rendering locally. In other words, a client computer device may include a local graphics processor of limited computing power. In some scenarios, the computing power of the local graphics processor of a client computer device may be limited in order to conserve battery life in the client computer device. To enjoy high-performance graphics rendering and other forms of computation despite of this limitation, any, some, or all of the client computer devices of environment 10 may request service from server computer system 14.

Continuing in FIG. 1, to provide client computer devices 12 access to additional computing power, the client computer devices are operatively coupled to server computer system 14 through network/input-output (IO) controllers 16. The network/IO controllers may include a local-area network (LAN) controller, an Ethernet controller, or a Wi-Fi and/or Bluetooth controller, for example. Thus, the network that operatively couples the server computer system to the client computer devices may include a wired or wireless network, a local-area or long-range network, or any combination thereof. Naturally, the client computer devices too will include appropriate IO componentry to communicate with the network/IO controllers of the server computer system.

Server computer system 14 includes suitable componentry to receive graphics-rendering or other computation requests from the networked or otherwise connected client computer devices 12—e.g., to render graphics and send rendered graphics back to the client computer devices. In various embodiments contemplated herein, the graphics-rendering requests may include DirectX, PhysX or OpenGL instructions, as examples. In other embodiments, the server computer system may be configured to receive computation requests not necessarily related to graphics rendering, but executable nevertheless via the GPUs installed on the server computer system. As such, the computation requests may originate from a framework configured to support massively parallel GPU computing—a CUDA® or OpenCL® framework, for example.

Continuing in FIG. 1, server computer system 14 includes a central processing unit (CPU) 18 and associated memory 20. The CPU may include a plurality of independent processing cores and an on-board memory cache (not shown in the drawings). In general, the memory associated with the CPU may include volatile and non-volatile memory. The memory may conform to a typical hierarchy of static and or dynamic random-access memory (RAM), read-only memory (ROM), magnetic, and/or optical storage. In the embodiment of FIG. 1, one portion of the memory holds an operating system (OS) kernel 22, and another portion of the memory holds data 24. In this and other embodiments, additional portions of the memory may hold additional components of the server OS—e.g., drivers and a framework—while still other portions of the memory may hold server applications and code to support the various services provided by the server computer system.

Data 24 may include any data structure useful for the operation of server computer system 14. Such data structures may instantiate a plurality of virtual machines (VMs) 26 created by the OS of the server computer system. In one embodiment, a virtual machine may be instantiated for each client computer device 12 whose request for service has been accepted by the server computer system. Once a virtual machine has been instantiated, suitable server-system componentry (e.g., network/IO controllers 16 may operatively couple that virtual machine to a corresponding client computer device.

Typically, each virtual machine 26 includes an instance of an OS kernel (the same or different than kernel 22), appropriate drivers, and a private memory segment. Each virtual machine runs in a separate process context on CPU 18 and may spawn multiple threads. In general, the threads spawned from the virtual machines may include various computing processes—e.g., processes that render graphics during execution. Still other computing processes may be launched directly from the OS of the server computer system, or from an OS shell or application running on the OS.

Continuing in FIG. 1, server computer system 14 also includes a plurality of GPUs 28. These GPUs are configured to render graphics or perform other parallel computation on behalf of client computer devices 12—or any computing process—upon receiving appropriate GPU service requests issued by the process. As used herein, a 'GPU service request' may include a request for memory allocation, page-table allocation, interrupt processing, power management, graphics channel allocation and deallocation, polling for a GPU event, or getting/setting a GPU configuration, as non-limiting examples. Subsequent drawing figures provide additional detail on GPUs 28 and on other aspects of server computer system 14 and environment 10. It is useful to note, however, that the structural details provided herein should not be understood in limiting sense, for numerous variations remain within the spirit and scope of this disclosure. For instance, the structure and function of server computer system 14 may, in some examples, be distributed among a plurality of networked computer systems.

Figure 2:
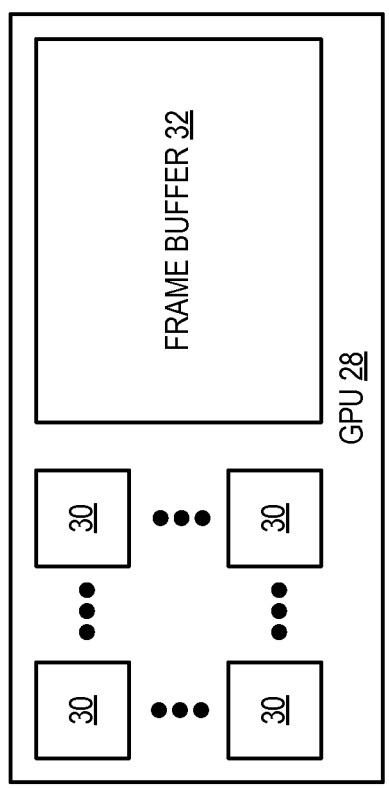
FIG. 2 shows aspects of a GPU in accordance with an embodiment of this disclosure.

FIG. 2 shows aspects of GPU 28 in an example embodiment. GPU 28 has a plurality of processing cores 30 and associated RAM. The RAM includes frame buffer 32, which is accessible to the processing cores via a memory cache system (not shown in the drawings). The frame buffer is configured to store the pixels of an image as that image is being rendered.

Figure 3:
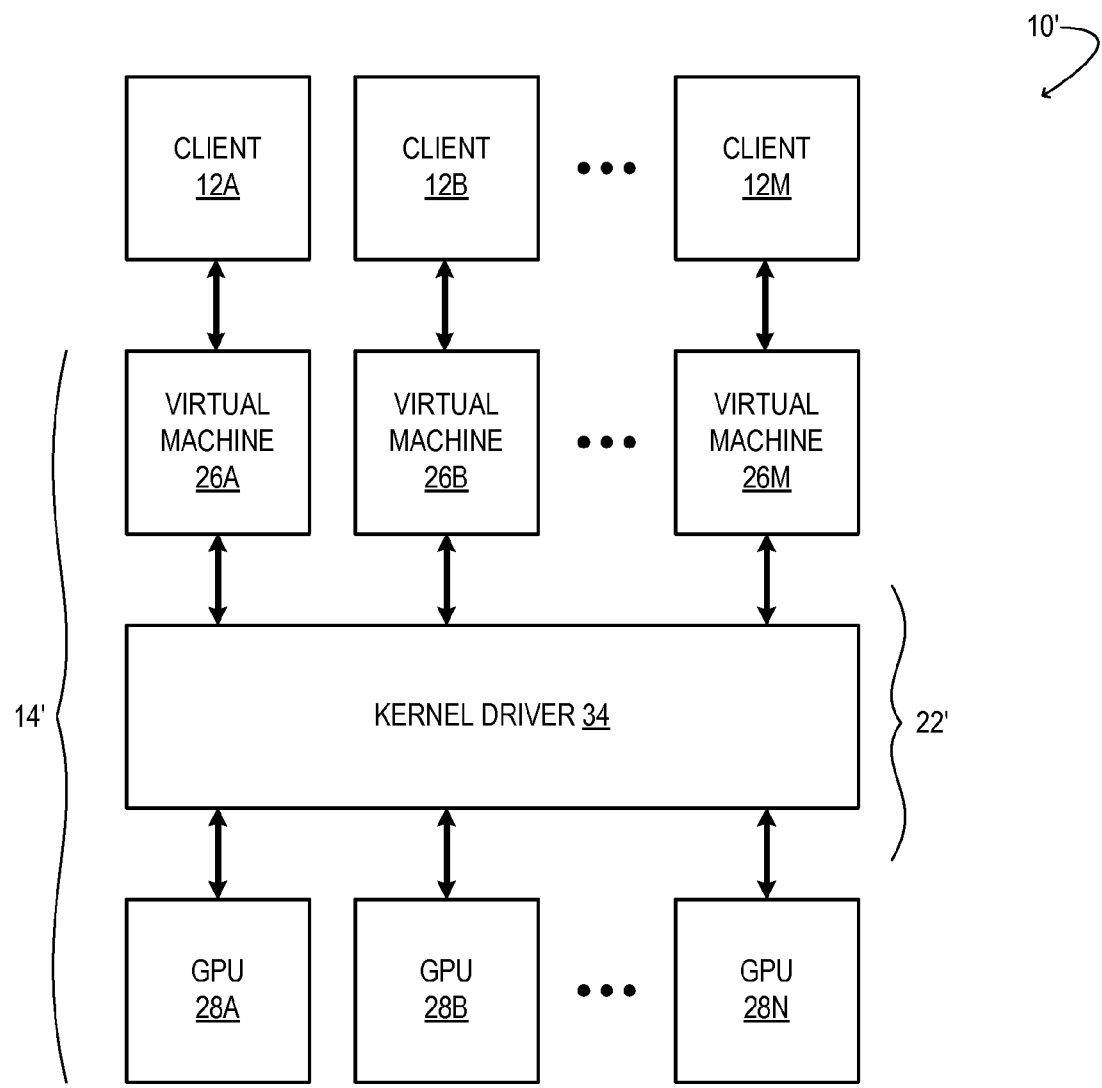
FIG. 3 shows additional aspects of one embodiment of the client-server environment of FIG. 1.

FIG. 3 shows additional aspects of one embodiment of the client-server environment described above. In environment 10', kernel 22' includes a kernel driver 34, which enables sharing of a plurality of GPUs 28 by a plurality of virtual machines 26. The kernel driver may be a component of OS kernel 22' of server computer system 14'. One function of the kernel driver is to perform low-level management of each GPU installed in the server computer system. Accordingly, each virtual machine thread communicates with the kernel driver to manage GPU resources. The kernel driver may also route various GPU service requests from one or more virtual machines 26 to one or more GPUs 28.

By routing the GPU service requests to a large number of installed GPUs (e.g., ten or more), it is possible, in principle, to support parallel graphics rendering on a large number of virtual machines. However, there are scalability limits to the approach of FIG. 3. The scalability issue arises from the need to manage a large number of GPUs from a single kernel-driver module. As GPUs are among the most complex of IO devices, supporting a large number of GPUs from a single kernel-driver module requires a highly multi-threaded driver design. In the embodiment of FIG. 3, for example, kernel driver 34 may be charged with supporting concurrent execution of interrupt service requests (ISRs) for every installed GPU and handling system calls from multiple threads in parallel.

Figure 4:
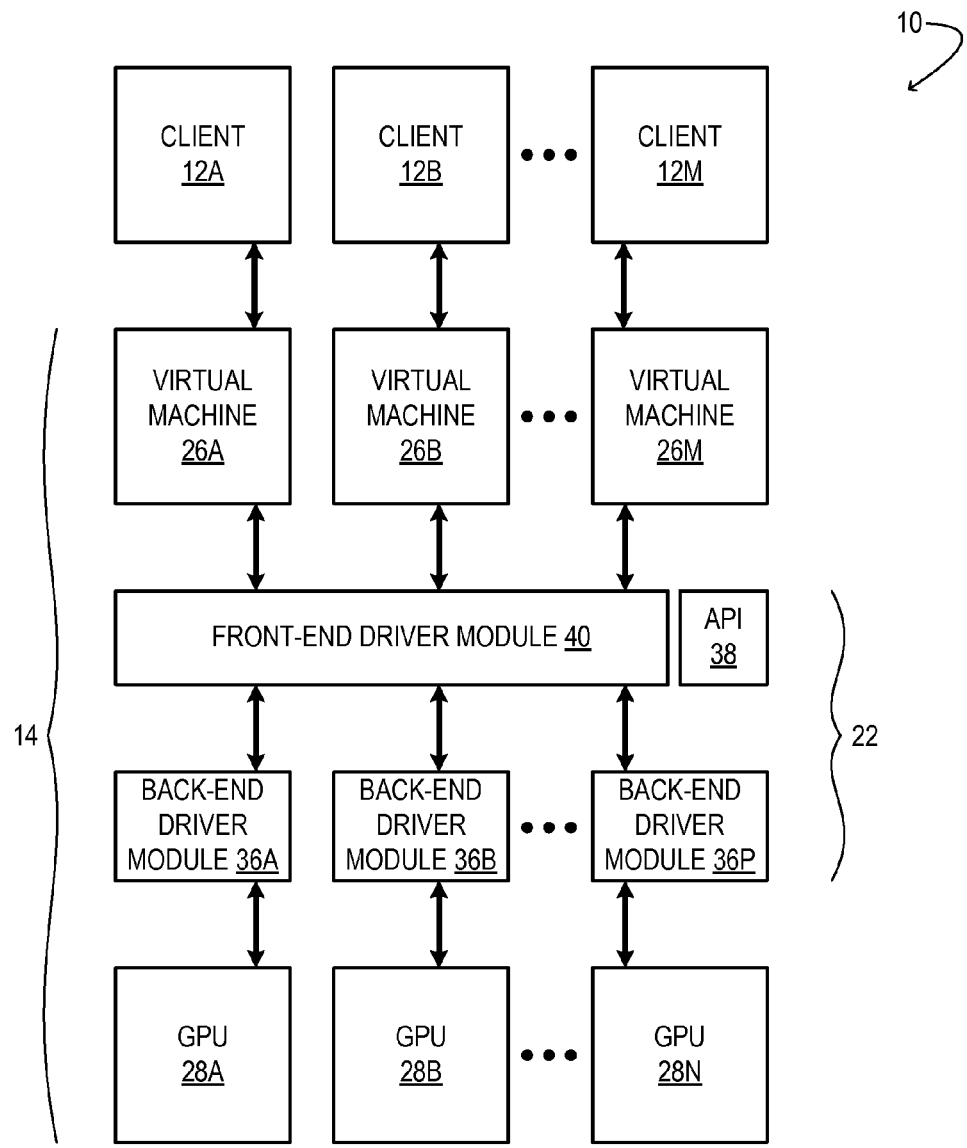
FIG. 4 shows additional aspects of another embodiment of the client-server environment of FIG. 1.

To address these issues and provide still other advantages, the approach of FIG. 4 is provided. FIG. 4 shows additional aspects of another embodiment of a client-server environment. In environment 10, a plurality of back-end driver modules 36 are instantiated in kernel 22. In one embodiment, the back-end driver modules are replicas of each other. Each back-end driver module controls a subset of the installed GPUs, thereby reducing the need for multi-threaded driver design. More specifically, each back-end driver module handles ISRs only for the GPUs associated with it. In some embodiments, each back-end driver module is also configured to perform low-level management of the subset of GPUs associated with it. In one embodiment, each back-end driver module can be configured to associate itself with a pre-defined subset of the GPUs installed in server computer system 14 while the back-end driver module is being loaded. In one embodiment, the number of GPUs to be associated with any back-end driver module may be programmatically configurable via a system API or other utility. In particular, non-limiting examples, the number of associated GPUs may be one, two, or three. This degree of configurability may be used to provide the best performance for a given system configuration. Specifically, any time the system is being configured or reconfigured, decisions can be made regarding how many back-end driver modules to instantiate and how many GPUs to have each one control. Such decisions can be made to negotiate a tradeoff in system performance versus memory usage—inasmuch as each instance of the back-end driver module may require a non-negligible commitment of memory.

Although an initial configuration decision may be made at boot-up, it is also envisaged that the various kernel drivers may be dynamically reloaded throughout the lifetime of the service platform of server computer system 14, and in such scenarios the above tradeoff may be renegotiated pursuant to changes in the user environment. For instance, server computer system 14 may initially serve a large number of users (fifty, for example) with low-to-moderate graphics-virtualization needs. These users may be executing remote-desktop computing or similar services, for example. At this point, it may be advantageous to map a relatively small number of back-end driver modules with a relatively large number of GPUs (e.g., five or more). Later in the day, for example, the user population may change such that a smaller number of users (ten, for example) with more intensive graphics-virtualization needs may log on. These users may be playing video games with rich, 3D graphics, or consuming HD video. Pursuant to this change, a larger number of back-end driver modules may be instantiated in server computer system 14, with each one controlling only one or two GPUs. In still other scenarios, an even more granular approach may be taken, with system calls from a particular virtual machine handled by one back-end driver module, which maps to one GPU.

To effect configurable association between GPUs and back-end driver modules, an application programming interface (API) 38 is provided in server computer system 14. The API exposes the mapping between the GPUs and back-end driver modules, so that it can be controlled programmatically. In other embodiments, a different kind of configuration interface (other than an API) may be used to control the mapping between GPUs and back-end driver modules. The mapping may be controlled, for instance, by passing a kernel-module parameter to that back-end driver module.

To concurrently handle all GPU service requests across the entire series of virtual machines 26, a shared front-end driver module 40 is also instantiated in kernel 22. The front-end driver module may be operatively coupled to every computing process that sends instructions to GPUs 28—e.g., the virtual machines 26 of the illustrated embodiment. In addition, the front-end driver module is operatively coupled to each of the back-end driver modules. In one embodiment, the front-end driver module is a thin layer that maintains a list of back-end driver modules registered with it. This module enacts appropriate decision making to route system calls to the appropriate back-end driver module. In the configuration of FIG. 4, each back-end driver module is configured to receive a GPU service request routed to that back-end driver module by the front-end driver module and to route the GPU service request to one or more of the GPUs.

When a back-end driver module is registered with the front-end driver module, the front-end driver module provides the list of GPUs that the back-end driver module is going to handle. The front-end driver module maintains 'book-keeping' data describing this mapping. Then, when a GPU service request comes to the front-end driver module, the front-end driver module looks through the data to identify which GPU should be targeted by the request, and routes the request to the back-end driver module associated with that GPU. In some embodiments, the mapping may be controlled or influenced via API 38, which is operatively coupled to each back-end driver module to enable programmer control over the mapping between the plurality of virtual machines or other computing processes and the plurality of installed GPUs.

One advantage of the approach of FIG. 4 is that scales up performance in a GPU subsystem having numerous, multi-core GPUs, by assigning a separate driver instance to each group of one or more GPUs. This strategy provides benefits in terms of user deployment, scalability of performance, and driver implementation. With respect to driver implementation, the separate driver instances provide ease of concurrency and ensure synchronization without needing to employ fine-grain locking.

No aspect of the foregoing description or drawings should be interpreted in a limiting sense, for numerous other embodiments lie fully within the spirit and scope of this disclosure. For instance, while the disclosed approach is indeed applicable to a client-server system in which GPU resources on the server are virtualized for sharing among various client devices, other applications are envisaged as well. The plurality of computing processes referred to hereinabove may include processes running locally on the server computer system, for example. Accordingly, not every computing process need be associated with a virtual machine.

The configurations described above enable various methods to allow a graphics-consumer process to render graphics using resources of a computer system, such as server computer system 14. Accordingly, some such methods are now described, by way of example, with continued reference to the above configurations. It will be understood, however, that the methods here described, and others fully within the scope of this disclosure, may be enabled by other configurations as well. Naturally, each execution of a method may change the entry conditions for a subsequent execution and thereby invoke a complex decision-making logic. Such logic is fully contemplated. Further, some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 5:
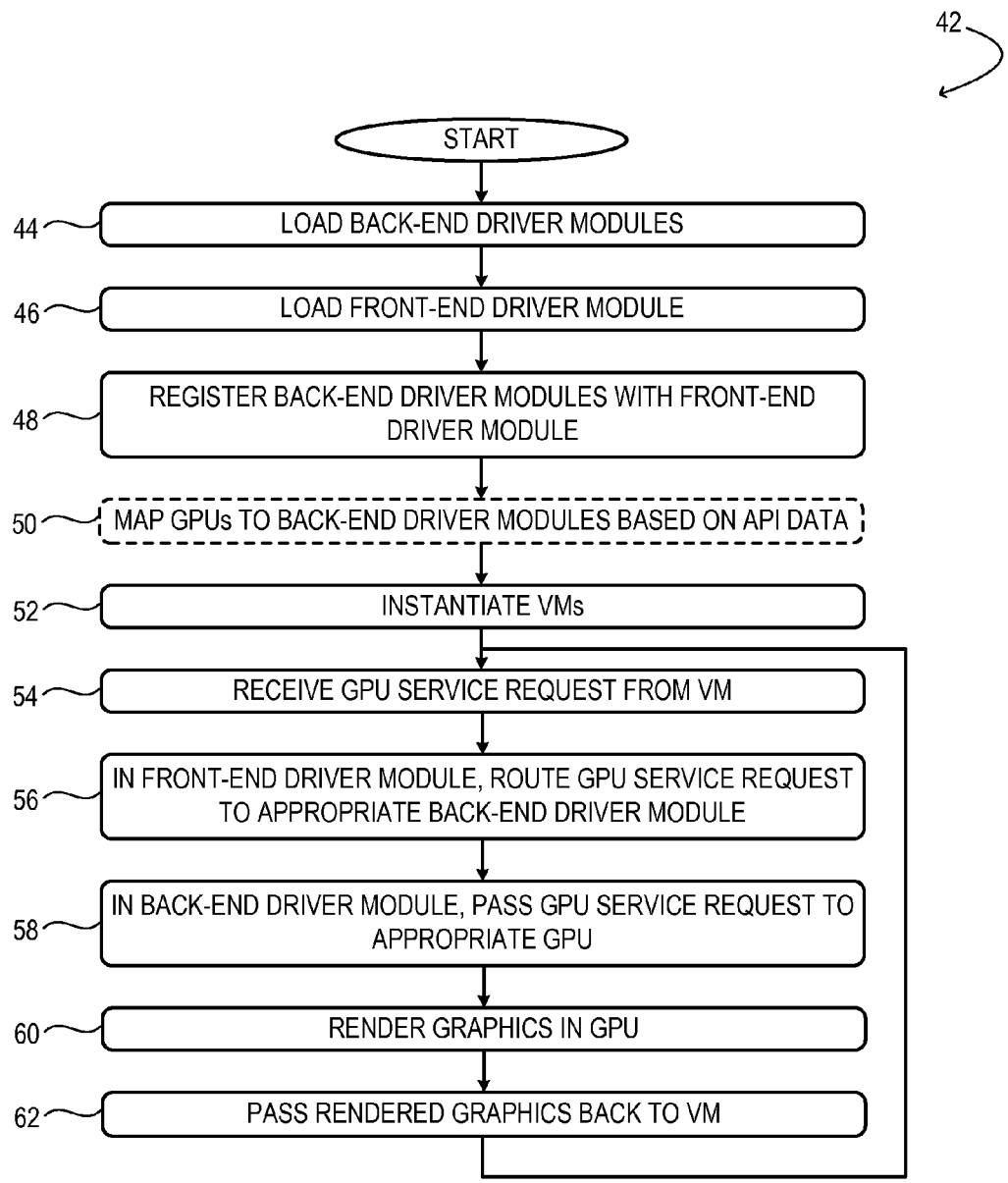
FIG. 5 illustrates an example method to enable a graphics consumer process to render graphics using resources of a computer system, in accordance with an embodiment of this disclosure.

FIG. 5 illustrates an example method 42 to be executed on a server computer system with a plurality of installed GPUs. The method enables various client computer devices to render graphics using resources on a server computer system, as described above.

At 44 of method 42, a plurality of back-end driver modules are loaded into the OS kernel of the server computer system. As noted above, these back-end driver modules are configured to receive GPU service requests from a front-end driver module (vide infra) and to route the GPU service requests to one or more of the GPUs. At 46 a shared front-end driver module is loaded into the OS kernel of the server computer system. At 48, in a process executed concurrently with 46, the back-end driver modules are registered with the front-end driver module. At optional step 50, the back-end driver modules so registered are mapped to the GPUs installed in the server computer system based on data from an API, such as API 38 of FIG. 4. At 52 a plurality of virtual machines are instantiated in memory of the server computer system. Such virtual machines may be associated with a corresponding plurality of client computer devices that have requested graphics-rendering service from the server computer system. In some embodiments, therefore, the number of virtual machines instantiated may correspond to the number of client computer devices whose requests for service have been accepted.

At 54 of method 42, a GPU service request is received in the front-end driver module. The GPU service request may be received from one of the virtual machines instantiated in the memory of the server computer system. At this point, the front-end driver module determines which back-end driver module the GPU service request is to be routed to. Then, at 56, the GPU service request is routed by the front-end driver module to the back-end driver module determined in this manner. At 58 the GPU service request received in the appropriate back-end driver module is routed by the back-end driver module to the appropriate GPU or GPUs. At 60 the GPU service request is executed by the GPU to which it is routed, which enables subsequent graphics rendering in the GPU on behalf of the graphics-consumer process, the accumulation of an image in the frame buffer of the GPU, etc. At 62, graphics rendered in this manner is routed back to the virtual machine that issued the service request.

It will be understood that the configurations and/or approaches described herein are exemplary in nature, and that these specific embodiments or examples are not to be considered in a limiting sense, because numerous variations are possible. As such, various acts illustrated and/or described may be performed in the sequence illustrated and/or described, in other sequences, in parallel, or omitted.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system operatively coupled to a number of client computer devices, the computer system comprising:
a memory that holds an operating system (OS) having a kernel, the operating system configured to launch a plurality of computing processes that are performed in response to requests from the client computer devices; and
a plurality of graphics processing units (GPUs) coupled to the memory, each of the GPUs configured to execute instructions on behalf of the computing processes subject to a GPU service request;
the kernel comprising:
a front-end driver module instantiated in the kernel and configured to receive a GPU service request from any of the computing processes; and
multiple back-end driver modules instantiated in the kernel, each of the back-end driver modules associated with a respective subset of the GPUs, wherein the front-end driver module is configured to send the GPU service request to any of the back-end driver modules, wherein the front-end driver module is further configured to determine which back-end driver module of the back-end driver modules is to receive the GPU service request from the front-end driver module, and wherein the back-end driver module that receives the GPU service request is configured to pass the GPU service request to a GPU associated with the back-end driver module.

2. The computer system of claim 1 wherein the OS is further configured to launch a plurality of virtual machines, each virtual machine operatively coupled to a client computer device, wherein the computer system is a server computer system, and wherein each client computer device requests service from the computer system.

3. The computer system of claim 2 wherein the plurality of virtual machines are operatively coupled to the client computer devices via a network.

4. The computer system of claim 3 wherein the network is selected from the group consisting of: a wireless network; and a local-area network.

5. The computer system of claim 2 wherein at least one client computer device is a smartphone, tablet computer, or portable game system.

6. The computer system of claim 1 wherein the GPU service request is issued by a DirectX, PhysX, or OpenGL driver process.

7. The computer system of claim 1 wherein the GPU service request is issued by a driver process supporting massively parallel GPU computing not necessarily related to graphics rendering.

8. The computer system of claim 1 wherein each back-end driver module is configured to perform low-level management of the GPUs with which it is associated.

9. The computer system of claim 1 wherein the back-end driver modules are replicas of each other.

10. The computer system of claim 1 wherein each back-end driver module is configured to handle an interrupt-service request for the GPUs with which it is associated.

11. The computer system of claim 1 wherein each back-end driver module is configured, during loading, to associate with a predefined subset of the GPUs.

12. The computer system of claim 1 wherein the number of GPUs associated with any back-end driver module is programmatically configurable.

13. The computer system of claim 12 wherein a mapping between the back-end driver modules and the plurality of GPUs is programmatically configurable.

14. The computer system of claim 13 wherein the number of back-end driver modules is changed in response to a change in the number of client computer devices, wherein the mapping between the GPUs and the back-end driver modules is changed in response to a change in the number of back-end driver modules, and wherein the front-end driver module is configured to access the mapping to determine which back-end driver module is to receive the GPU service request.

15. The computer system of claim 1 wherein each back-end driver module is configured to pass the GPU service request to exactly one GPU.

16. The computer system of claim 1 wherein the front-end driver module is operatively coupled to every computing process executing instructions on one or more of the GPUs.

17. The computer system of claim 1 wherein the number of the back-end driver modules instantiated in the kernel and the number of the GPUs associated with each of the back-end driver modules is changed in response to at least one of a change in the number of client computer devices and a change in an amount of computing resources required by the computing processes.

18. A method to be executed on a server computer system with a plurality of installed graphics processing units (GPUs) to enable client computer devices to render graphics using resources on the server computer system, the method comprising:
loading a front-end driver module in an operating-system (OS) kernel of the server computer system;
instantiating a virtual machine associated with a client computer device in memory of the server computer system;
loading multiple back-end driver modules in the OS kernel of the server computer system, each back-end driver module of the back-end driver modules associated with a respective subset of the GPUs and configured to receive a GPU service request from the front-end driver module and pass the GPU service request to an associated GPU;
registering each back-end driver module of the back-end driver modules with the front-end driver module, wherein the front-end driver module is configured to send the GPU service request to any of the back-end driver modules;
in the front-end driver module, receiving the GPU service request from the virtual machine, determining which back-end driver module of the back-end driver modules is to receive the GPU service request, and routing the GPU service request to the back-end driver module so determined; and
reconfiguring the server computer system in response to at least one of the number of client computer devices and an amount of computing resources required by requests from the client computer devices crossing a threshold, said reconfiguring comprising changing the number of back-end driver modules instantiated in the OS kernel.

19. The method of claim 18 wherein the virtual machine is among a plurality of virtual machines associated with a corresponding plurality of client computer devices.

20. A method to be executed on a server computer system with a plurality of installed graphics processing units (GPUs) to enable a number of client computer devices to render graphics using resources on the server computer system, the method comprising:

loading a front-end driver module in an operating-system (OS) kernel of the server computer system;

instantiating a virtual machine associated with a client computer device in memory of the server computer system;

loading multiple back-end driver modules in the OS kernel of the server computer system, each back-end driver module of the back-end driver modules associated with a respective subset of the GPUs and configured to receive a GPU service request from the front-end driver module and pass the GPU service request to an associated GPU;

registering each back-end driver module of the back-end driver modules with the front-end driver module, wherein the front-end driver module is configured to send the GPU service request to any of the back-end driver modules;

mapping the plurality of GPUs to the back-end driver modules according to data exposed in an application programming interface of the server computer system;

in the front-end driver module, receiving the GPU service request from the virtual machine, determining which back-end driver module of the back-end driver modules is to receive the GPU service request, and routing the GPU service request to the back-end driver module so determined; and reconfiguring the server computer system in response to at least one of a change in the number of client computer devices and a change in an amount of computing resources required by requests from the client computer devices crossing a threshold, said reconfiguring comprising changing the number of back-end driver modules instantiated in the OS kernel.

\* \* \* \* \*